(12) United States Patent
Ruediger et al.

(10) Patent No.: US 9,731,380 B2
(45) Date of Patent: Aug. 15, 2017

(54) DEVICE FOR OPERATING A MACHINE TOOL AND MACHINE TOOL

(71) Applicant: Continental Automotive GmbH, Hannover (DE)

(72) Inventors: Garn Ruediger, Niederwiesa OT Possendorf (DE); Andreas Lenk, Bannewitz Ot Possendorf (DE); Martin Schroeder, Donaustauf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 181 days.

(21) Appl. No.: 14/772,303

(22) PCT Filed: Mar. 11, 2014

(86) PCT No.: PCT/EP2014/054733
§ 371 (c)(1),
(2) Date: Sep. 2, 2015

(87) PCT Pub. No.: WO2014/140033
PCT Pub. Date: Sep. 18, 2014

(65) Prior Publication Data
US 2016/0008921 A1    Jan. 14, 2016

(30) Foreign Application Priority Data
Mar. 11, 2013   (DE) .................. 10 2013 204 151

(51) Int. Cl.
*B23K 26/082*  (2014.01)
*B23K 26/062*  (2014.01)
(Continued)

(52) U.S. Cl.
CPC .......... *B23K 26/0823* (2013.01); *B23K 26/03* (2013.01); *B23K 26/064* (2015.10);
(Continued)

(58) Field of Classification Search
CPC ............ B23K 26/0828; B23K 26/0624; B23K 26/064; B23K 26/082
(Continued)

(56) References Cited

U.S. PATENT DOCUMENTS

| 4,316,074 A | 2/1982 | Daly | .......................... 219/121.6 |
| 4,935,093 A * | 6/1990 | Reeb | .................. G06K 19/0672 |
| | | | 216/20 |

(Continued)

FOREIGN PATENT DOCUMENTS

| DE | 102004011985 A1 | 9/2004 | ............. B23K 26/00 |
| DE | 102007017548 A1 | 12/2007 | ............... G06K 1/00 |

(Continued)

OTHER PUBLICATIONS

European Office Action, Application No. 14709299.3, 5 pages, Dec. 2, 2016.
(Continued)

*Primary Examiner* — Samuel M Heinrich
(74) *Attorney, Agent, or Firm* — Slayden Grubert Beard PLLC

(57) ABSTRACT

A device is provide for operating a machine tool. The machine tool includes a rotation unit designed to rotate a workpiece about an axis of rotation with an adjustable rotational speed progression, and an ultra-short pulse laser for generating laser pulses, the laser being arranged such that material of the workpiece is removed by means of the laser pulses. The device is configured to adjust the rotational speed progression based on geometry data of a specified geometry and/or a specified surface quality characteristic value representative of a corresponding surface quality.

11 Claims, 1 Drawing Sheet

(51) Int. Cl.
 *B23K 26/064* (2014.01)
 *B23K 26/08* (2014.01)
 *B23K 26/03* (2006.01)
 *B23K 26/0622* (2014.01)
 *B23K 101/06* (2006.01)

(52) U.S. Cl.
 CPC ........ *B23K 26/0624* (2015.10); *B23K 26/082* (2015.10); *B23K 2201/06* (2013.01)

(58) Field of Classification Search
 USPC .............. 219/121.68, 121.73, 121.75, 121.8, 219/121.83
 See application file for complete search history.

(56) References Cited

U.S. PATENT DOCUMENTS

| | | | | |
|---|---|---|---|---|
| 8,168,917 | B2 | 5/2012 | Blakeley | 219/121.6 |
| 2003/0089690 | A1 | 5/2003 | Yamazaki et al. | 219/121.66 |
| 2008/0308750 | A1 | 12/2008 | Abeln et al. | 250/492.1 |
| 2011/0024400 | A1* | 2/2011 | Rumsby | B23K 26/0732 219/121.61 |
| 2012/0211923 | A1 | 8/2012 | Garner et al. | 264/400 |
| 2014/0116995 | A1* | 5/2014 | Berg | B23K 26/0823 219/121.6 |
| 2014/0291308 | A1 | 10/2014 | Lasagni et al. | 219/121.75 |

FOREIGN PATENT DOCUMENTS

| | | | | |
|---|---|---|---|---|
| DE | 102006036151 | A1 | 2/2008 | B23K 26/36 |
| DE | 102008015403 | A1 | 9/2009 | B23K 26/02 |
| DE | 102011011734 | A1 | 8/2012 | B23K 26/06 |
| JP | 5671592 | A | 6/1981 | B23K 26/00 |
| JP | 62158588 | A | 7/1987 | B21B 27/00 |
| JP | 2008087023 | A | 4/2008 | B21D 39/04 |
| JP | 2011124455 | A | 6/2011 | H01L 21/28 |
| WO | 2014/140033 | A2 | 9/2014 | B23K 26/03 |

OTHER PUBLICATIONS

German Office Action, Application No. 102013204151.9, 7 pages, Jul. 12, 2013.
International Search Report and Written Opinion, Application No. PCT/EP2014/054733, 25 pages, Nov. 5, 2014.
Chinese Office Action, Application No. 201480014528.2, 16 pages, Jun. 20, 2016.

* cited by examiner

DEVICE FOR OPERATING A MACHINE TOOL AND MACHINE TOOL

CROSS-REFERENCE TO RELATED APPLICATIONS

This application is a U.S. National Stage Application of International Application No. PCT/EP2014/054733 filed Mar. 11, 2014, which designates the United States of America, and claims priority to DE Application No. 10 2013 204 151.9 filed Mar. 11, 2013, the contents of which are hereby incorporated by reference in their entirety.

TECHNICAL FIELD

The invention relates to a device for operating a machine tool and to a corresponding machine tool for machining a workpiece.

BACKGROUND

Classic methods for workpiece machining, such as for example turning, often have the tendency to form a burr or require long process times.

SUMMARY

One embodiment provides a device for operating a machine tool, the machine tool having a rotation unit, which is designed to rotate a workpiece about an axis of rotation with an adjustable rotational speed progression, and has an ultra-short pulse laser for generating laser pulses, which is arranged such that material of the workpiece is removed by means of the laser pulses, the device being designed to adjust the rotational speed progression on the basis of geometry data of a specified geometry.

Another embodiment provides a device for operating a machine tool, the machine tool having a rotation unit, which is designed to rotate a workpiece about an axis of rotation with an adjustable rotational speed progression, and has an ultra-short pulse laser for generating laser pulses, which is arranged such that material of the workpiece is removed by means of the laser pulses, the device being designed to adjust the rotational speed progression on the basis of a specified surface quality characteristic value that is representative of a corresponding surface quality.

In a further embodiment, the device is additionally designed to adjust the rotational speed progression on the basis of geometry data of a specified geometry.

In a further embodiment, the machine tool additionally has a galvanometer scanner, which is arranged between the ultra-short pulse laser and the workpiece and is designed to displace a point of impingement of the respective laser pulse on the surface of the workpiece along the axis of rotation with an adjustable scanning speed progression, the device additionally being designed to adjust the scanning speed progression on the basis of geometry data of a specified geometry.

In a further embodiment, the machine tool additionally has a galvanometer scanner, which is arranged between the ultra-short pulse laser and the workpiece and is designed to displace a point of impingement of the respective laser pulse on the surface of the workpiece along the axis of rotation with an adjustable scanning speed progression, the device being additionally designed to adjust the scanning speed progression on the basis of a specified surface quality characteristic value that is representative of a corresponding surface quality.

Another embodiment provides a machine tool for machining a workpiece, including a rotation unit, which is designed to rotate the workpiece about an axis of rotation with an adjustable rotational speed progression, an ultra-short pulse laser for generating laser pulses, which is arranged such that material of the workpiece is removed by means of the laser pulses, and a device as disclosed above.

In a further embodiment, the machine tool includes a galvanometer scanner, which is arranged between the ultra-short pulse laser and the workpiece and is designed to displace a point of impingement of the respective laser pulse on the surface of the workpiece along the axis of rotation with an adjustable scanning speed progression, and a device as disclosed above.

In a further embodiment, the machine tool has an objective arranged between the galvanometer scanner and the workpiece, for focusing the laser pulses at a respective focal point.

In one embodiment, the objective is a flat field objective.

In one embodiment, the focal length of the objective is between 50 mm and 100 mm.

In a further embodiment, the ultra-short pulse laser is arranged in such a way that the laser pulses impinge on the workpiece tangentially.

In a further embodiment, the pulse duration of the laser pulses is between 0.5 ps and 1 ps.

In a further embodiment, the pulse repetition frequency of the laser pulses is between 0.5 MHz and 2 MHz.

In a further embodiment, the power range of the ultra-short pulse laser is between 5 W and 10 W.

BRIEF DESCRIPTION OF THE DRAWINGS

Example embodiments of the invention are explained in more detail below with reference to the drawings, in which.

DETAILED DESCRIPTION

Figure 1:
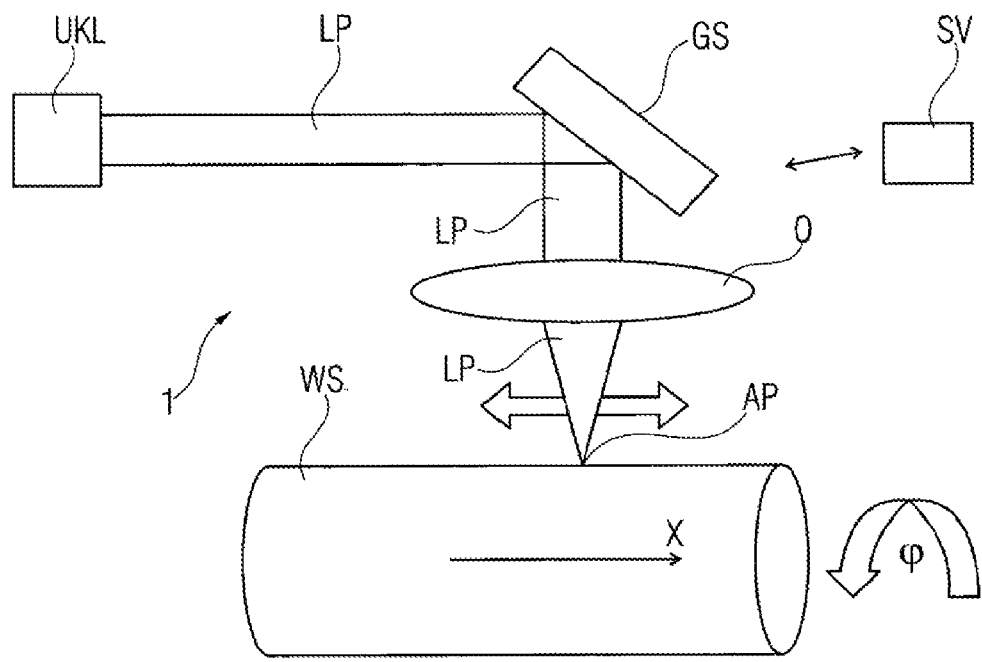
FIG. 1 shows a machine tool with a control device, according to an example embodiment.

Embodiments of the invention provide a device for operating a machine tool and a corresponding machine tool that respectively contribute to making good machining of a workpiece possible.

Some embodiments provide a device for operating a machine tool and a corresponding machine tool for machining a workpiece that has the device. The machine tool has a rotation unit, which is designed to rotate a workpiece about an axis of rotation with an adjustable rotational speed progression. Furthermore, it has an ultra-short pulse laser for generating laser pulses, which is arranged such that material of the workpiece is removed by means of the laser pulses. According to a first aspect, the device is designed to adjust the rotational speed progression on the basis of geometry data of a specified geometry.

With laser pulses of an ultra-short pulse laser, very good material removal can be achieved. When the laser pulses impinge on the workpiece, this produces a removal of cold material, in which the material to be removed goes over directly from a solid state into a gaseous state. It may be the case here that no burr is formed. Adjusting the rotational speed progression allows a pulse overlap of the laser pulses to be set. The pulse overlap means in this connection the interface of a first area of impingement of a first laser pulse on the workpiece with an area of impingement of a second laser pulse on the workpiece. The pulse overlap is consequently representative of a rate of removal or an intensity of the removal of the material. Consequently, a specified geometry of the workpiece can be produced in an easy way by means of adjusting a rotational speed progression.

In some embodiments, the device is designed to adjust the rotational speed progression on the basis of a specified surface quality characteristic value that is representative of a corresponding surface quality.

The surface quality is dependent on the pulse overlap, which is dependent on the rotational speed progression. Consequently, the surface quality can be set in an easy way by means of adjusting the rotational speed progression. It is consequently possible in an easy way to produce a particularly smooth and/or rough surface and/or a specified functional surface.

In some embodiments, the device is additionally designed to adjust a rotational speed progression on the basis of geometry data of a specified geometry.

Since both the surface quality and the geometry of the workpiece are dependent on the pulse overlap, both can be set by means of the rotational speed progression.

In some embodiments, the machine tool additionally has a galvanometer scanner, which is arranged between the ultra-short pulse laser and the workpiece and is designed to displace a point of impingement of the respective laser pulse on the surface of the workpiece along the axis of rotation with an adjustable scanning speed progression. The device is additionally designed to adjust a scanning speed progression on the basis of geometry data of a specified geometry.

Using the galvanometer scanner, the point of impingement of the laser pulses can be displaced along the axis of rotation. Consequently, the pulse overlap can be set both along an angle of rotation by means of the rotational speed progression and along the axis of rotation by means of the scanning speed progression. Consequently, a very precise setting of the pulse overlap in two axes is possible. Consequently, the geometry can be produced in a very precise manner.

In some embodiments, the machine tool additionally has a galvanometer scanner, which is arranged between the ultra-short pulse laser and the workpiece and is designed to displace a point of impingement of the respective laser pulse on the surface of the workpiece along the axis of rotation with an adjustable scanning speed progression. The device is additionally designed to adjust the scanning speed progression on the basis of a specified surface quality characteristic value that is representative of a corresponding surface quality.

This allows the pulse overlap to be set both along an angle of rotation by means of the rotational speed progression and along the axis of rotation by means of the scanning speed progression. Consequently, a very precise setting of the pulse overlap in two axes is possible. Consequently, the surface quality can be produced in a very precise manner.

In some embodiments, the machine tool has an objective, which is arranged between the galvanometer scanner and the workpiece, for focusing the laser pulses at a respective focal point.

Use of an objective makes setting of a focal point possible in an easy way. Consequently, the laser pulses can be focused at a focal point in an easy way.

In some embodiments, the objective is a flat field objective. A flat field objective, which is also known as an F-theta objective, makes it possible for the focal point to be displaced along a straight line, such as for example parallel to the axis of rotation, by means of the galvanometer scanner. This allows geometries and/or surface qualities that may be specified to be produced in an easy way.

In some embodiments, the focal length of the objective lies between 50 mm and 100 mm.

In some embodiments, the ultra-short pulse laser is arranged in such a way that the laser pulses impinge on the workpiece tangentially.

Very good material removal may be possible in this way. For example, the laser pulses impinge on the material tangentially and approximately at right angles to the axis of rotation.

In some embodiments, the pulse duration of the laser pulses lies between 0.5 ps and 1 ps. Very good material removal may be possible as a result.

In some embodiments, the pulse repetition frequency of the laser pulses lies between 0.5 MHz and 2 MHz.

In some embodiments, the power range of the ultra-short pulse laser lies between 5 W and 10 W.

FIG. 1 shows a machine tool 1. The machine tool 1 has an ultra-short pulse laser UKL. The power range of the ultra-short pulse laser UKL lies for example between 5 W and 10 W.

The ultra-short pulse laser UKL emits laser pulses LP. These laser pulses LP have for example a pulse duration of between 0.5 ps and 1 ps. The pulse repetition frequency of the laser pulses LP lies for example between 0.5 MHz and 2 MHz.

The laser pulses LP impinge on a galvanometer scanner GS. The galvanometer scanner GS reflects the laser pulses LP in the direction of an objective O. In addition, a point of impingement AP of the laser pulses LP on the surface of a workpiece WS is displaceable by means of the galvanometer scanner GS along an axis of rotation X with an adjustable scanning speed progression.

The objective O focuses the laser pulses LP at a respective focal point, which for example corresponds to the point of impingement AP. For this, the objective O has for example one or more lenses. For example, the objective O is a flat field objective, or else F-theta objective, by means of which the focal point is displaceable on a straight line, which for example runs parallel to the axis of rotation X. Thus, the laser pulses LP impinge on the workpiece WS at the point of impingement AP. The laser pulses LP impinge for example on the workpiece WS tangentially. For example, they impinge on the workpiece WS tangentially and approximately at right angles to the axis of rotation X.

Using a rotation unit that is not shown, the workpiece WS can for example rotate about an axis of rotation X with an adjustable rotational speed progression.

In this way, material can be removed from the workpiece WS, for example in order to set a specified geometry and/or produce a specified surface quality.

The machine tool 1 additionally has a control device SV. The control device SV may also be referred to as a device for operating a machine tool.

The control device SP is designed to adjust the rotational speed progression about the axis of rotation X on the basis of geometry data of a specified geometry.

As an alternative or in addition, the control device SV is designed to adjust the rotational speed progression about the axis of rotation X on the basis of a specified surface quality characteristic value that is representative of a corresponding surface quality.

As an alternative or in addition, the control device SV is designed to adjust the scanning speed progression on the basis of geometry data of the specified geometry.

As an alternative or in addition, the control device SV is designed to adjust the scanning speed progression on the basis of a specified surface quality characteristic value that is representative of a corresponding surface quality.

In this way, a pulse overlap PU of the individual laser pulses LP can be set in an easy way. The pulse overlap PU is dependent on the rotational speed progression and the scanning speed progression. In addition, it may be dependent on the pulse repetition frequency of the ultra-short pulse laser UKL, which for example is constant.

Figure 2:
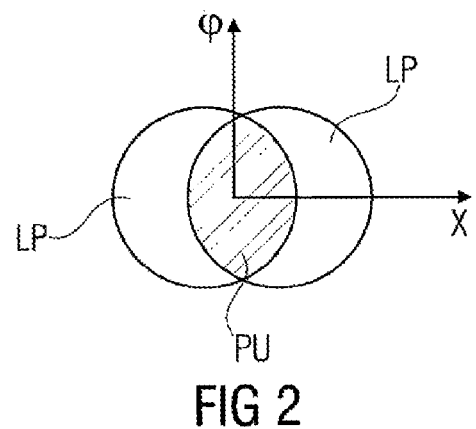
FIG. 2 shows a representation of a pulse overlap.

The pulse overlap PU is illustrated by FIG. 2. The pulse overlap PU means in this connection the interface of a first area of impingement of a first laser pulse LP on the workpiece WS with an area of impingement of a second laser pulse LP on the workpiece WS. The pulse overlap PU is consequently representative of a rate of removal, for example an intensity of the removal of the material.

The pulse overlap PU can be set along two axes. By means of adjusting the scanning speed progression by means of the galvanometer scanner GS, the pulse overlap PU can be set along the axis of rotation X. By means of adjusting the rotational speed progression, the pulse overlap PU can be set along an angle of rotation φ. In the example of FIG. 2, for example, the rotational speed is equal to 0, since no displacement takes place along the angle of rotation φ. The scanning speed in the example is greater than 0, since a displacement takes place along the axis of rotation X.

What is claimed is:

1. A device for operating a machine tool,
   wherein the machine tool has a rotation unit that rotates a workpiece about an axis of rotation with an adjustable rotational speed progression, and an ultra-short pulse laser for generating laser pulses, wherein the ultra-short pulse laser is arranged such that material of the workpiece is removed by the laser pulses, and
   wherein the device is configured to adjust the rotational speed progression based on speed control data comprising least one of (a) geometry data of a specified geometry or (b) a specified surface quality characteristic value representative of a corresponding surface quailty.

2. The device of claim 1, wherein the machine tool further comprises a galvanometer scanner arranged between the ultra-short pulse laser and the workpiece and configured to displace a point of impingement of the respective laser pulse on the surface of the workpiece along the axis of rotation with an adjustable scanning speed progression, and
   wherein the device is configured to adjust the scanning speed progression based on the speed control data.

3. A machine tool for machining a workpiece, with the machine tool comprising:
   a rotation unit configured to rotate the workpiece about an axis of rotation with an adjustable rotational speed progression,
   an ultra-short pulse laser that generates laser pulses and is arranged such that material of the workpiece is removed by the laser pulses, and
   a device configured to adjust the rotational speed progression based on speed control data comprising at least one of (a) geometry data of a specified geometry or (b) a specified surface quality characteristic value representative of a corresponding surface quality.

4. The machine tool of claim 3, comprising a galvanometer scanner arranged between the ultra-short pulse laser and the workpiece and configured to displace a point of impingement of the respective laser pulse on the surface of the workpiece along the axis of rotation with an adjustable scanning speed progression, and
   wherein the device is configured to adjust the scanning speed progression based on the speed control data.

5. The machine tool of claim 4, further compromising an objective arranged between the galvanometer scanner and the workpiece, wherein the objective is configured to focus the laser pulses at a respective focal point.

6. The machine tool of claim 5, wherein the objective comprises a flat field objective.

7. The machine tool of claim 5, wherein a focal length of the objective is between 50 mm and 100 mm.

8. The machine tool of claim 3, wherein the ultra-short pulse laser is arranged such that the laser pulses impinge on the workpiece tangentially.

9. The machine tool of claim 3, wherein a pulse duration of the laser pulses is between 0.5 ps and 1 ps.

10. The machine tool of claim 3, wherein a pulse repetition frequency of the laser pulses is between 0.5 MHz and 2 MHz.

11. The machine tool of claim 3, wherein a power range of the ultra-short pulse laser is between 5 W and 10 W.

* * * * *